US010901234B2

(12) United States Patent
Patin

(10) Patent No.: US 10,901,234 B2
(45) Date of Patent: Jan. 26, 2021

(54) ELECTRONIC FRAME FOR OPTICAL DEVICE AND OPTICAL DEVICE COMPRISING SUCH A FRAME

(71) Applicant: Essilor International, Charenton-le-Pont (FR)

(72) Inventor: Eric Patin, Ugine (FR)

(73) Assignee: Essilor International, Charenton-le-Pont (FR)

(*) Notice: Subject to any disclaimer, the term of this patent is extended or adjusted under 35 U.S.C. 154(b) by 101 days.

(21) Appl. No.: 15/762,906

(22) PCT Filed: Sep. 8, 2016

(86) PCT No.: PCT/FR2016/052246
§ 371 (c)(1),
(2) Date: Mar. 23, 2018

(87) PCT Pub. No.: WO2017/051093
PCT Pub. Date: Mar. 30, 2017

(65) Prior Publication Data
US 2018/0292672 A1    Oct. 11, 2018

(30) Foreign Application Priority Data

Sep. 24, 2015 (EP) .................................. 15306485

(51) Int. Cl.
*G02C 5/02* (2006.01)
*G02C 1/08* (2006.01)
*G02C 1/00* (2006.01)
*G02C 11/00* (2006.01)
*G02C 7/08* (2006.01)

(52) U.S. Cl.
CPC ................. *G02C 5/02* (2013.01); *G02C 1/08* (2013.01); *G02C 1/10* (2013.01); *G02C 7/083* (2013.01); *G02C 11/10* (2013.01)

(58) Field of Classification Search
None
See application file for complete search history.

(56) References Cited

U.S. PATENT DOCUMENTS 5,060,062 A * 10/1991 Dotson ..................... A61F 9/08
                                                         348/62
2005/0213025 A1    9/2005 Lane et al.
(Continued)

FOREIGN PATENT DOCUMENTS

CN    101019065 A    8/2007
CN    102947746 A    2/2013
(Continued)

OTHER PUBLICATIONS

International Search Report dated Nov. 24, 2016, in PCT/FR2016/052246, filed Sep. 8, 2016.
(Continued)

*Primary Examiner* — William R Alexander
*Assistant Examiner* — Gary W O'Neill
(74) *Attorney, Agent, or Firm* — Oblon, McClelland, Maier & Neustadt, L.L.P.

(57) ABSTRACT

An electronic frame for an optical device, the frame including a front frame element able to partially house at least one lens and including at least one electronic component, the front element extending, on either side of said at least one lens, over a retained length of said at least one lens. The front element includes a reinforcing element extending at least substantially over all said retained length of said at least one lens.

10 Claims, 2 Drawing Sheets

(56) References Cited

U.S. PATENT DOCUMENTS

| | | | |
|---|---|---|---|
| 2009/0251660 A1* | 10/2009 | Figler | G02C 7/101 |
| | | | 351/158 |
| 2012/0127420 A1* | 5/2012 | Blum | G02C 1/10 |
| | | | 351/113 |
| 2013/0070198 A1 | 3/2013 | Willey et al. | |
| 2014/0028966 A1 | 1/2014 | Blum et al. | |
| 2014/0204331 A1 | 7/2014 | Huh | |
| 2015/0131048 A1 | 5/2015 | Iurilli | |
| 2015/0248026 A1 | 9/2015 | Willey et al. | |
| 2016/0246059 A1* | 8/2016 | Halpin | G02B 27/0176 |

FOREIGN PATENT DOCUMENTS

| | | |
|---|---|---|
| WO | 2013/025933 A1 | 2/2013 |
| WO | 2013/175367 A1 | 11/2013 |
| WO | 2013/188805 A2 | 12/2013 |

OTHER PUBLICATIONS

Office Action dated Aug. 13, 2019, in Patent Application No. 201680056500.4, 6 pages (English translation only).

* cited by examiner

ELECTRONIC FRAME FOR OPTICAL DEVICE AND OPTICAL DEVICE COMPRISING SUCH A FRAME

The invention relates to an electronic frame.

It may be a question, by way of nonlimiting example, of a frame including electronic components, in order to obtain an optical device, for example a pair of spectacles equipped with correcting eyeglasses, for example with correcting lenses or eyeglasses such as variable-amplitude ophthalmic cells the amplitude of which is controlled via an electronic circuit, or indeed even with simple eyeglasses, whether tinted or not.

An electronic frame for an optical device usually includes:

a front element comprising an accommodating housing for at least one lens;

and at least one electronic component.

The term "front" will be understood to mean a set of elements of a frame for an optical device intended to be placed in front of a face when the frame is worn by a user.

Electronic frames may include fragile parts. It may for example be a question of electronic connections or of electronic components that can easily be damaged when they are deformed or indeed even of active lenses that include a plurality of materials joined together, for example lenses of variable-amplitude ophthalmic-cell type, the cell being controlled by an electronic circuit.

FIG. 1 shows a prior-art electronic frame 1, including a frame front 2 comprising a front element 5 bearing lenses 3, the electronic frame 1 also including two temples 4 that are each connected to the front element 5 by a hinge 6.

When a user puts the electronic frame 1 on his face, he stresses the hinges 6 of the temples 4 of the frame and deforms at least one of the elements of 2 of the electronic frame 1. More explicitly, when putting on the frame, the user separates the temples 4 from each other as indicated by the arrows F1 in FIG. 1.

This force causes a deformation of the temples 4, of the hinges 6 (possibly equipped with elastic return elements of the spring type), and of the front element 5 of the electronic frame, see the lenses 3.

This general deformation of the front element 5 is represented by an arrow F2 in FIG. 2: the solid line referenced by the reference D1 corresponds to the general shape of the front 2 of the frame when the temples 4 are not separated from each other. The dotted line referenced by the reference D2 corresponds to the general shape of the front 2 of the frame when the temples 4 are separated from each other. It may be seen that the front 2 of the frame is deformed via extension.

The magnitude of the observed deformation depends on the relative stiffnesses of the materials and of the elements from which the front element 5, the hinges 6 and the temples 4 are made.

It will also be noted that the deformation of the front element 2 in the direction of the arrow F2 also causes a deformation of the housing of the lenses 3 and therefore generates stresses on said lenses 3.

The invention aims to limit the deformation of certain portions of the electronic frame in order to preserve the fragile elements that it includes and that are unable to bear, or bear little, deformations related to the electronic frame being put on or removed by a user.

The invention relates to an electronic frame for an optical device, said frame including a front frame element able to partially house at least one lens and including at least one electronic component, said front element extending, on either side of said at least one lens, over a retained length of said lens, the electronic frame being noteworthy in that said front element includes a reinforcing element extending at least substantially over all said retained length of said at least one lens.

Thus, the reinforcing element prevents or, at the very least, limits deformation of the front element retaining a portion of the lens at least where the lens is retained in the front element.

The invention may also include the following features, separately or in combination:

the electronic frame may include two temples connected by a hinge at two ends of said front element, and the reinforcing element may extend between the two ends of said front element;

the reinforcing element may be integrally formed with the front element;

the reinforcing element may be added to the front element;

the reinforcing element may have a U-shaped cross section forming a cavity into which is at least partially inserted the front element;

the reinforcing element may be made from at least one of the materials belonging to the following group: aluminum alloy, magnesium alloy, titanium alloy or carbon fibers;

the front element may be a holder able to house an upper portion of said at least one lens;

the frame may include a cradle able to at least partially encircle a lower portion of said at least one lens;

the reinforcing element may retain the front element, preferably via fastening with the cradle;

the holder and cradle may be made of different materials;

the holder and cradle may be a single part made of a given material;

the front element may be made from flexible material;

the flexible material may be a thermoplastic elastomer.

The invention also relates to an optical device including an electronic frame such as defined above and at least one fragile lens.

The expression "fragile lens" will be understood to mean a lens that includes at least two joined-together layers of uniform material, each layer having a thickness larger than 30 µm.

The invention will be further understood with regard to an embodiment that will now be described with reference to the figures, in which.

For the sake of clarity, only the elements useful for understanding the embodiments described have been shown.

In addition, from one embodiment to the next, references designating a given element have been reused.

Lastly, in the following description, the terms "lower", "upper", "top", "bottom" etc. are used with reference to the drawings for the sake of facilitating comprehension. They must not be understood to be limitations on the scope of the invention.

Figure 1:
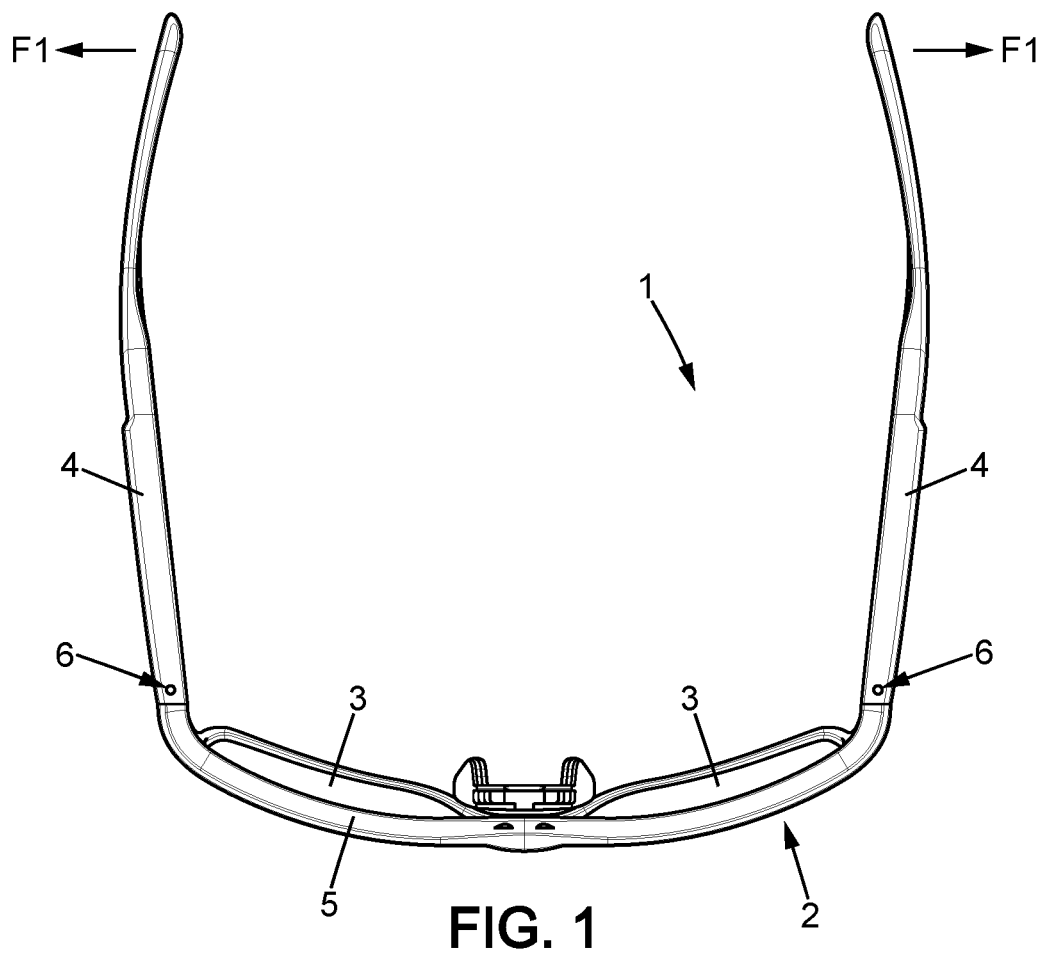
FIGS. 1 and 2 are top views of an optical device including an electronic frame equipped with lenses, according to the prior art.
Figure 2:
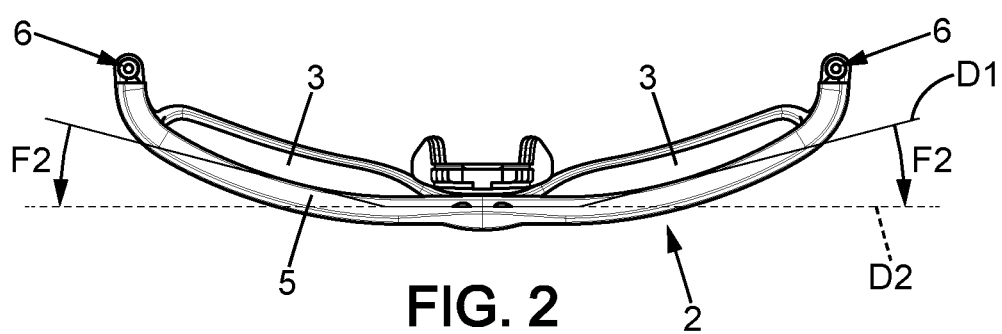
Figure 3:
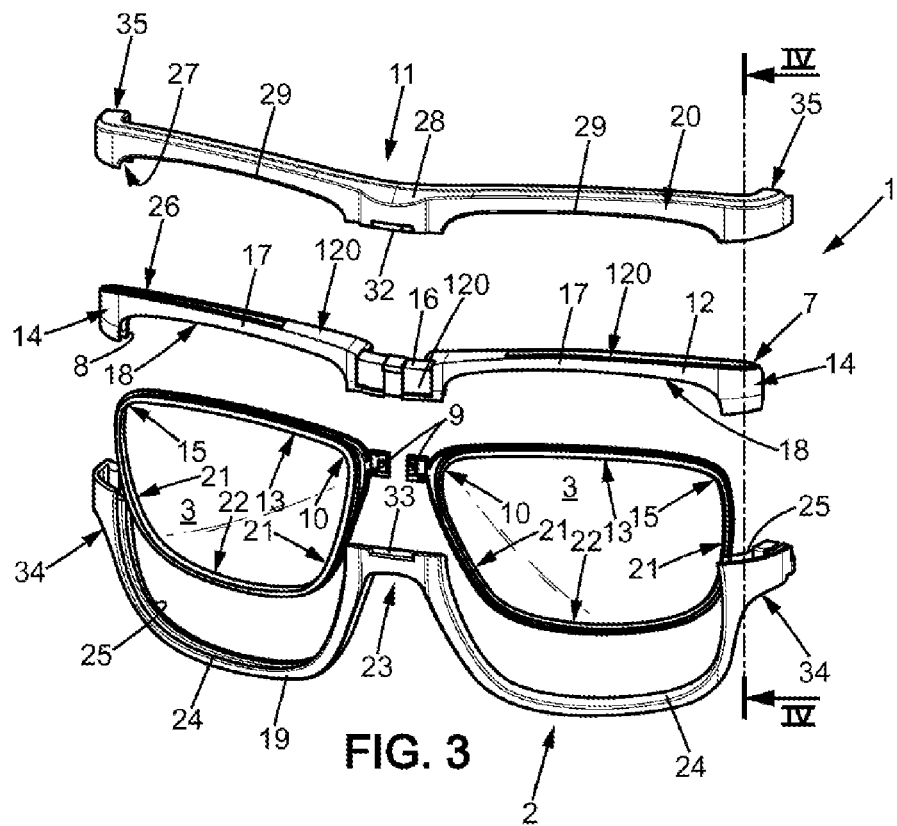
FIG. 3 is an exploded perspective view from in front of a front of an electronic frame according to the invention.

FIG. 3 shows several elements that together form an electronic frame according to the invention, and more particularly a front 2 of an electronic frame, i.e. the portion of the electronic frame that is placed in front of the face of a wearer of the electronic frame. The elements have been illustrated disassociated from one another.

The various elements may be assembled by screwing or adhesive bonding, or any other conventional assembling means.

The electronic frame 1 includes a front element 7 comprising an accommodating housing 8 able to partially house a lens 3. The frame 1 also includes at least one electronic component. An example of a component will be given below.

In the example illustrated in the figures, the electronic frame 1 is designed to receive two lenses 3 but it will be understood that the invention is not limited to an electronic frame designed to receive two lenses. Specifically, the electronic frame according to the invention could be designed to receive only one goggles- or mask-type lens, without departing from the context of the invention, the goggles- or mask-type lens being sufficiently large to reach in front of both eyes of a wearer when the electronic frame is being worn.

The lenses 3 may be active lenses (which are associated with an electronic component 9 allowing them to change state when the electronic component is activated).

For example, the lenses 3 are variable-amplitude ophthalmic cells, phase-modulation lenses, smart lenses, or hybrid lenses controlled by an electronic circuit 9.

It should be understood that the invention is not limited to an optical device including an electronic frame equipped with active lenses. Specifically, a device including an electronic frame according to the invention may be equipped with passive lenses, i.e. lenses that may (or may not) have optical properties but that are not designed to change state (under the control of an electronic component, for example).

In addition, in the context of this example, the two lenses 3 are fragile lenses, i.e. lenses that include at least two joined-together layers of uniform material, each layer having a thickness larger than 30 μm.

The two materials may optionally be identical.

These lenses are intrinsically fragile because a substantial portion of their volume is nonuniform, this possibly creating a risk of deterioration at the interface/joint of these materials. Specifically, joining materials of large thickness, larger than 30 μm, has the effect of decreasing the solidity of the lens by generating, in the zone in which the layers of material are joined, weaknesses that may lead to breakage of the lens or to delamination effects in case of mechanical stresses.

In one non-limiting example, a fragile lens may be an assembly of at least 2 mineral shells of thickness larger than 30 μm, these shells being directly adhesively bonded to each other or separated by an electroactive material (electrochromic material, liquid crystal, etc.) or passive material (polymer, adhesive, photopolymer, etc.).

In another non-limiting example, a fragile lens may be a hybrid lens formed from plastic and mineral materials of non-negligible thickness.

In another non-limiting example, a fragile lens may be a smart lens consisting of a mineral waveguide encapsulated by an organic material, or any other lens subject to delamination or presenting weaknesses because of the use of joined materials.

Figure 4:
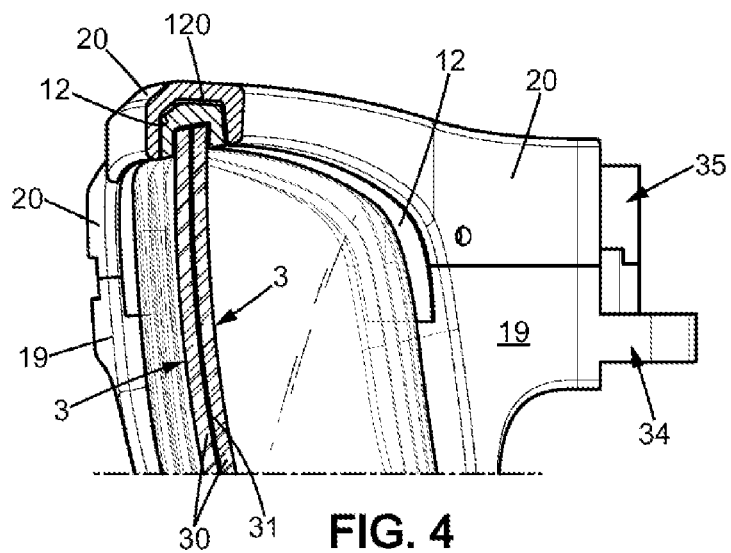
FIG. 4 is a cross-sectional view of the plane shown in FIG. 3, the elements of the front being assembled together.

FIG. 4 shows in cross section a variable-amplitude ophthalmic-cell-type lens 3, the lens 4 comprising two parallel walls 30, made from a first material, between which is imprisoned a layer 31 made from a second material.

Each of the lenses 3 is of ovoid shape and is connected to its control circuit 9 positioned on a portion 10 of the lens, the portion 10 being intended to be positioned facing the nose of a wearer of the electronic frame 1.

The zone of the electronic frame 1 designed to be positioned level with the nose of a wearer will be called the nasal zone 11 of the electronic frame 1.

In the described example, the front element 7 at least partially receiving the lenses 3 is a holder 12 designed to at least partially accommodate an upper portion 13 of the lenses 3.

The holder 12 is a longitudinal part that extends between two ends 14, the two ends of the holder 12 bordering the top exterior sides 15 of the lenses 3.

The holder 12 has a central portion 16 located level with the nasal zone 11 of the electronic frame 1.

On either side of the central portion 16, the holder 12 has two portions 17 that are symmetric with respect to the central portion 16.

Each symmetric portion 17 is formed by a circularly arcuate profile 18 that includes a groove, corresponding to the aforementioned housing 8, the groove 8 being designed to accommodate the upper portion 13 of the lens 3. The curvature of the circularly arcuate shape 18 substantially corresponds to the shape of the upper portion 13 of the lens.

The groove 8 extends over a length, called the retained length, because the lens is retained in the groove 8 over its entire length.

The holder 12 bears an electronic component that is a flexible strip 120 bearing conductive bands, the flexible strip 120 extending substantially the entire length of the holder 12 and being fastened by adhesive bonding at least partially to an upper edge face 26 and to the central portion 16 of the holder 12 (the upper edge face 26 is located opposite the groove accommodating the lens 3).

In the present example embodiment, the electronic frame 1 also includes a cradle 19 and a reinforcing element 20 (FIG. 3), respectively allowing the lateral portions 21 and lower portions 22 of the lenses 3 to be encircled and the rigidity of the holder 12 partially housing the lenses 3 to be increased.

The cradle 19 and the reinforcing element 20 are designed to fasten together, to enclose the holder 12 (partially housing the lenses 3), and to encircle the lenses 3 so as to hold them in place.

The cradle 19 includes a central cradle portion 23 designed to belong to the elements of the nasal zone 11 of the electronic frame 1.

On either side of the central portion 23 of the cradle 19, the latter includes two cradle 19 portions 24 that are symmetric with respect to the central portion 23, each of the symmetric cradle 19 portions 24 having a shape complementary to that of the lateral portions 21 and lower portions 22 of the lenses 4.

Each of the symmetric portions 24 includes an internal groove 25 into which are inserted the edges of the lateral portions 21 and lower portions 22 of the lenses 3 (FIG. 3).

The reinforcing element 20, which increases the rigidity of the holder 12, extends the entire length of the holder 1, the reinforcing element 20 covering all the holder 12, to which it is added, and the ends 14 of the holder 12.

Thus, the reinforcing element 20 extends over the two retained lengths of the lenses 3 in the holder 12.

The reinforcing element 20 also covers the central portion 16 of the holder 12 belonging to the elements of the nasal zone 11 of the electronic frame 1.

The reinforcing element 20 has a shape that is substantially identical to that of the holder 12, and has a U-shaped cross section forming a housing 27 in order to accommodate the holder 12 and the electronic component 120 fastened to the holder 12 (FIGS. 3 and 4). The U shape gives the reinforcing element 20 a geometric characteristic that in particular allows a reasonable weight to be preserved, so that the electronic frame 1 is comfortable to wear.

The housing 27 is sufficiently deep to accommodate the holder 12 so that the holder 12 is covered over at least half its thickness.

The reinforcing element thus has a central reinforcing portion 28, which belongs to the elements of the nasal zone 11 of the electronic frame, and two reinforcing portions 29 that are symmetric with respect to the central reinforcing portion 38 and that lie on either side of the central portion 28.

The central reinforcing portion 28 is designed to be assembled with the central cradle portion 23.

Each of the central reinforcing portion 28 and central cradle portion 23 includes a notch, 32 and 33, respectively, the two notches 32 and 33 facing each other when the cradle 19 is assembled with the reinforcing element 20.

In this way, when the cradle 19 and the reinforcing element 20 are assembled and form a casing around the lenses 3 and the holder 12, the two notches 32 and 33 form an aperture passing through the casing of the nasal zone 11 of the electronic frame 1.

The cradle 19 and the reinforcing element 20 lastly include ends 34 and 35, respectively, which are configured to be assembled with the temple ends and to receive a hinge.

The cradle 19 and the holder 16 may be made from the same material or from different materials.

Since the reinforcing element 20 increases the rigidity of the holder 16, provision may be made to make the holder 16 (and optionally the cradle 24) from a flexible material, such as for example a thermoplastic elastomer, thereby allowing the edges of the lenses 3 to be easily inserted into the grooves 8 and 25 of the holder 12 and the cradle 24. A flexible material also allows the energy of any shocks to be absorbed.

Such is not the case with the reinforcing element 20.

The reinforcing element 20 is made from a material capable of sufficiently increasing the rigidity of the holder at least over the length of the circularly arcuate profile 18 (substantially corresponding to the length of the lens 3 retained in a symmetric portion 17 of the holder 12) so that, when a wearer separates the temples of the optical device, this portion of the holder 12 does not deform.

The reinforcing element 20 also increases the rigidity of the nasal zone 11 of the electronic frame, which may include fragile electronic components, and which would be a zone prone to deformation if only the rigidity of the zones of the circularly arcuate profiles 18 of the holder 12 were increased. Specifically, the reinforcing element 20 deforms only little, or even not at all, when it is subjected to the separation of the temples of the frame.

The reinforcing element also allows the rigidity of the front 2 of the electronic frame 1 to be increased with respect to types of stresses other than those related to the temples being opened.

For example, the reinforcing element 20 has a weight lower than 10 g and preferably substantially equal to 6 g for a device the total weight of which (without the lenses) does not exceed 32 g.

The rigidity of the reinforcing element may be expressed as a bow resulting from a couple exerted about the pivot point of the hinge, the nasal zone being fixed: The bow is measured at the pivot point of the hinge, in the plane normal to the axis of the hinge.

The optical device considered below is a conventional spectacle frame, of about 32 g.

In one example, when a couple of 0.05 Nm is applied to such a frame (force of 50 g at 100 mm from the axis of a hinge) equipped with a reinforcing element 20, the bow is 0.07 mm. By way of comparison, in a conventional plastic frame without reinforcing element 20, the bow is several tens of millimeters, or even several millimeters (4 mm is measured for a standard plastic frame).

In this example, the stiffness measured for the frame equipped with a reinforcing element 20 is substantially 714 Nm/m. The higher the K value, the more rigid the frame. By way of comparison, the stiffness to this type of stress of the standard plastic frame, not equipped with the reinforcing element 20, is 12.5 Nm/m.

Advantageously, under the stress required to separate the temples when the frame is placed on the head of a wearer (50 g force at 100 mm from the axis of the hinge) the deformation of the housing of the lens is smaller than 0.1 mm (0.07 mm for example) with a frame equipped with a reinforcing element 20 (versus 4 mm for a standard plastic frame).

By way of example, the reinforcing element 20 may be made from an aluminum alloy, from a magnesium alloy, a titanium alloy or from carbon fibers.

By virtue of the above description it will be understood how the invention allows the lenses, whether fragile or not, of electronic frames to be preserved by virtue of the presence of the reinforcing element 20 and its advantageous placement in the frame.

It should however be understood that the scope of the invention is not specifically limited to the embodiment illustrated in FIGS. 3 and 4 and that it encompasses the implementation of any equivalent means.

For example, the embodiment shown in FIGS. 3 and 4 describes a reinforcing element 20 added to the holder 12. An embodiment in which the holder 12 and the reinforcing element are a single part would also be an embodiment according to the invention.

It could, for example, be a question of an embodiment in which the holder and the reinforcing element were molded together by virtue of double-shot injection molding of two thermoplastic resins in a mold.

The reinforcing element could also consist of a portion of the holder with a larger thickness, giving said reinforcing element a sufficient hardness to prevent deformation of the zone of the circularly arcuate profile of the holder accommodating a lens 3.

The invention claimed is:

1. An electronic frame for an optical device, the electronic frame comprising:
   a front frame element configured to partially house at least one lens;
   a cradle configured to at least partially encircle a lower portion of the at least one lens;
   a reinforcing element; and
   at least one electronic component,
   the front frame element extending, on either side of the at least one lens, over a retained length of the at least one lens,
   the reinforcing element extending at least substantially over all the retained length of the at least one lens, the front frame element, the reinforcing element and the cradle being separate pieces, the front frame element being a holder configured to house an upper portion of the at least one lens, and the reinforcing element retaining the holder via fastening with the cradle, the reinforcing element having a U-shaped cross section forming a housing accommodating the holder and the electronic component fastened to the holder, thus enclosing the holder between the reinforcing element and the cradle.

2. The electronic frame as claimed in claim 1, further comprising: two temples connected by a hinge at two ends of the front frame element, wherein the reinforcing element extends between the two ends of the front frame element.

3. The electronic frame as claimed in claim 1, wherein the reinforcing element is integrally formed with the front frame element.

4. The electronic frame as claimed in claim 1, wherein the reinforcing element is added to the front frame element.

5. The electronic frame as claimed in claim 4, wherein the front frame element is made from a flexible material.

6. The electronic frame as claimed in claim 5, wherein the flexible material is a thermoplastic elastomer.

7. The electronic frame as claimed in claim 1, wherein the reinforcing element is made from at least one of materials belonging to the following group: aluminum alloy, magnesium alloy, titanium alloy or carbon fibers.

8. The electronic frame as claimed in claim 1, wherein the holder and the cradle are made of different materials.

9. The electronic frame as claimed in claim 1, wherein the holder and the cradle are a single part made of a given material.

10. An optical device comprising:

the electronic frame according to claim 1; and at least one fragile lens.

* * * * *